United States Patent
Link et al.

(10) Patent No.: US 11,813,654 B2
(45) Date of Patent: Nov. 14, 2023

(54) EXPANDED METAL FOR AUTOMOTIVE INTERIOR PARTS

(71) Applicant: GRAMMER Interior Components GmbH, Hardheim (DE)

(72) Inventors: Manfred Link, Mudau-Reisenbach (DE); Ralf Tuerk, Wallduern (DE)

(73) Assignee: GRAMMER Interior Components GmbH, Hardheim (DE)

( * ) Notice: Subject to any disclaimer, the term of this patent is extended or adjusted under 35 U.S.C. 154(b) by 294 days.

(21) Appl. No.: 17/068,473

(22) Filed: Oct. 12, 2020

(65) Prior Publication Data
US 2021/0154724 A1    May 27, 2021

(30) Foreign Application Priority Data

Nov. 21, 2019    (DE) .................. 102019131399.6

(51) Int. Cl.
| | | |
|---|---|---|
| *B21D 31/04* | (2006.01) | |
| *B60R 13/02* | (2006.01) | |
| *E04C 2/42* | (2006.01) | |

(52) U.S. Cl.
CPC ......... *B21D 31/046* (2013.01); *B21D 31/043* (2013.01); *B60R 13/02* (2013.01); *E04C 2/427* (2013.01)

(58) Field of Classification Search
CPC ...... B21D 31/043; Y10T 29/18; B60H 1/3407
See application file for complete search history.

(56) References Cited

U.S. PATENT DOCUMENTS

| | | | |
|---|---|---|---|
| 4,881,307 A * | 11/1989 | Gaissmaier | B21D 31/04 |
| | | | 29/6.1 |
| 2011/0061436 A1 | 3/2011 | Greenwood | |
| 2019/0134690 A1 | 5/2019 | Kirchknopf et al. | |

FOREIGN PATENT DOCUMENTS

| | | | |
|---|---|---|---|
| DE | 102005002017 A1 | 7/2006 | |
| DE | 102006001721 A1 | 7/2007 | |
| DE | 102017126315 | 2/2017 | |
| DE | 102017126315 | 5/2019 | |
| EP | 1537923 A1 * | 6/2005 | ........... B21D 31/043 |
| EP | 2073999 B1 | 2/2016 | |

(Continued)

OTHER PUBLICATIONS

"Raised Expanded Metal with Various Materials & Designs" Catalog, Boegger, May 10, 2016, https://www.steelexpandedmetal.com/steelexpandedmetal/raised-expanded-metal.html (Boegger) (Year: 2016).*

*Primary Examiner* — Humera N. Sheikh
*Assistant Examiner* — Kevin C T Li
(74) *Attorney, Agent, or Firm* — Von Rohrscheidt Patents (57) ABSTRACT

An expanded metal produced by repeated penetration of a movable cutting die including teeth into a metal sheet that is run through an expansion device in a feed direction, the expanded metal including a plurality of loops, wherein the loops include bars that envelop loop openings and that are connected in nodes, wherein each of the loops includes a loop opening length measured in the feed direction along a line from a node center to node another center of two nodes that are arranged behind one another in the feed direction, wherein each of the loops includes a loop opening width that is measured transversal to the feed direction along a line from a node center to a node center of two nodes that are arranged adjacent to each other transversal to the feed direction.

7 Claims, 4 Drawing Sheets

(56) References Cited

FOREIGN PATENT DOCUMENTS

JP          S516857 A1   10/1978
WO    WO9906248 A1   2/1999

\* cited by examiner

EXPANDED METAL FOR AUTOMOTIVE INTERIOR PARTS

RELATED APPLICATIONS

This application claims priority from and incorporates by reference German Patent Application DE 10 2019 131 399.6 filed on Nov. 21, 2019.

FIELD OF THE INVENTION

The invention relates to an expanded metal produced by a repeated plunging of a cutting die including teeth into a metal sheet that is run through an expansion device in a feed direction.

BACKGROUND OF THE INVENTION

Expanded metals are well known in the art. DE 10 2005 002017 A1 relates to an expanded metal and to a device with particular engineering features to fabricate expanded metals and is incorporated by reference.

Expanded metals are metal sheets that are provided with approximately diamond shaped openings by a non-chipping fabrication method. For this purpose a metal sheet is run in a feed direction between a fixed cutting die and a reciprocating cutting die. On the cutting dies, typically the movable cutting die is provided with the tooth contour. The die teeth penetrate the metal and displace metal sections. During this process the movable cutting die alternates transversal to the feed direction between tow penetration positions. This generates diamond shaped openings.

Depending on the configuration of the expansion cutting die the metal sheet is expanded in the feed direction, horizontal to the feed direction which means transversal to the feed direction or parallel to the feed direction or in both directions simultaneously and goes through a dimensional change in the respective direction.

Expanded metal is used in many fields, e.g. in construction but also in gardening and increasingly also for interior trim pieces in the automotive industry.

The invention relates in particular to a fabrication of expanded metal for interior trim pieces for automobiles. One application for expanded metals of this type are covers for air vents for vehicle ventilation systems, in particular for defroster systems for windshields. In this respect DE 10 2017 126 315 owned by applicant and also published as US 2019/0134690A1 is incorporated in its entirety by this reference. This document shows how tooth geometries of the expansion cutting die influence opening cross sections of loop openings of the expanded metal. This changes in particular loop shapes of expanded metal loops that are arranged in a row adjacent to each other which influences a flow out direction of air coming from the ventilation system.

It is known in the art to use expanded metal to fabricate covers that are used in vehicle interiors in particular for covering speakers. The expanded metal is esthetically more appealing than imitated structures that are introduced into injection molded plastic components. Using expanded metal for covers for dash boards in vehicles is well known in the art.

High quality speaker covers are currently produced by stamping, milling or etching or by laser engraving stainless steel. These techniques facilitate fabricating variable opening structures and sizes in an individual configuration and implementing opening size changes that do not show any incremental transition to a viewer. Overall these fabrication methods provide a high level of freedom of design which, however they come at a high cost due to the choice of material and the fabrication methods.

BRIEF SUMMARY OF THE INVENTION

Thus, it is an object of the invention to provide a novel material for fabricating interior trim pieces for motor vehicles which facilitates esthetically appealing design variants and which has a fabrication cost that is between known expanded metals and machined stainless steel.

The object is achieved by an expanded metal produced by repeated penetration of a movable cutting die including teeth into a metal sheet that is run through an expansion device in a feed direction, the expanded metal including a plurality of loops, wherein the loops include bars that envelop loop openings and that are connected in nodes, wherein each of the loops includes a loop opening length measured in the feed direction along a line from a node center to node another center of two nodes that are arranged behind one another in the feed direction, wherein each of the loops includes a loop opening width that is measured transversal to the feed direction along a line from a node center to a node center of two nodes that are arranged adjacent to each other transversal to the feed direction, wherein the loops are arranged adjacent to one another in rows that extend transversal to the feed direction and behind one another in columns that extend parallel to the feed direction, wherein the loop opening length of loops arranged behind one another in the columns varies in the feed direction along a longitudinal section of the expanded metal, wherein the loop opening length of loops arranged adjacent to each other in the rows is constant, or wherein the loop opening width of the loops arranged behind one another in the columns in the feed direction vanes in the feed direction along a longitudinal section of the expanded metal wherein the loop opening width of the loops that are arranged adjacent to each other in the rows is constant.

The expanded metal according to the invention provides a continuous change of dimensions of loop opening cross sections in the feed direction, in particular of the loop opening length and/or of the loop opening width. Advantageously the loop opening length as well as the loop opening width are varied simultaneously, wherein loop dimensions of loops in a row are identical.

This way an esthetically appealing transition is generated between open portions and closed portions. Thus, the expanded metal can be used for the first time e.g. for motor vehicle speaker covers or dash board covers where areas that have functional openings transition into smooth closed cover areas. The expanded metal can be used e.g. for covering a dash board that includes speaker openings. The dashboard can be essentially closed, thus configured without openings. Required openings are provided in the area of the speakers. Thus, the teachings of the invention provide a transition area. Thus, the expanded metal forms an optically continuous transition between the closed portion and the open portion through a dimensional change of the loop opening width and/or the loop opening length. Since different loop opening dimensions are achieved by varying the penetration depth of the expansion cutting die it is possible to place no openings at all into the metal sheet in boundary sections but to only introducing embossings in these areas.

It is also conceivable to use the expanded metal as a cover and to generate an optical wave effect e.g. by continuously adjusting the loop opening lengths and/or the loop opening widths in an essentially flat surface or along a surface that is cambered only in one radius.

An advantageous embodiment of the invention is characterized in that the loop opening width and/or the loop opening length of loops that are arranged in columns behind one another varies from row to row, in particular when dimensional differences in the loop opening width and/or the loop opening length from row to row are sized so that the optical appearance of continuously variably loop opening dimensions is generated.

These features provide a very harmonious appearance of the expanded metal.

It is possible that a bar width of loops that are arranged in rows adjacent to one another and in columns behind one another is constant in spite of variations in loop opening dimensions.

Alternatively it is provided that a loop width of loops that are arranged in rows adjacent to one another and in columns behind one another varies with the variation of the loop opening dimensions.

Both variants facilitate to implement certain optical effects through ratio of open and closed portions in the expanded metal.

In another embodiment it is provided that the loops of loop rows that are sequentially arranged in the feed direction forms groups, wherein a loop opening width and/or loop opening length of loops in a group is identical, however, the loop opening width and/or the loop opening length between the loops of various groups varies.

This facilitates a constant bar width of loops of a group, however, a different bar width from group to group. Alternatively, it is conceivable that a bar width of loops of different groups is constant.

Last not least the bar width of rows of loops that are arranged adjacent to each other is constant but differs from loop row to loop row within a group.

The object is also achieved by a motor vehicle interior trim component like a speaker cover, air vent cover or dashboard made from the expanded metal described supra.

The object is also achieved my a method for producing an expanded mental wherein bars that envelop the loop openings are connected in nodes, each loop has a loop length in the feed direction that is measured from a node center to a node center of two nodes that are arranged opposite to each other in the feed direction, wherein each loop has a loop width transversal to the feed direction, wherein the loop width is measured from node center to node center of two nodes that are arranged opposite to wherein the loops are arranged transversal to the feed direction in rows adjacent to one another and parallel to the feed direction in columns behind one another, wherein a penetration depth of the expansion cutting die is adapted while maintaining a continuous expansion cutting die movement of the expansion device and a continuous feed of the metal sheet, so that a loop opening length and/or a loop opening width of loops arranged behind one another is varied.

The method according to the invention is characterized in that a penetration depth of the expansion cutting die is adapted during a continuous expansion cutting die movement of the expansion device and during a continuous feed of the metal sheet to be worked by the expansion device. Through the adaptation of the penetration depth the loop shape, in particular the loop opening length and/or the loop opening width is variable. A continuously reduced penetration depth of the movable expansion cutting die leads to a reduced loop length or loop width. An expansion cutting die tooth geometry can be selected so that either the loop opening length or the loop opening width remains essentially constant.

As a result the penetration depth of the movable expansion cutting die into the sheet metal to be worked can be varied between a maximum depth and a depth of zero or almost zero during the running production process so that a substantial stroke variation is adjustable. In view of up to 800 strokes per minute this places considerable requirements upon the adjusting mechanism and the associated control. However, it is conceivable that the number of strokes used to produce a section is reduced with a continuously changing loop length. A reduction down to 200 strokes per minute can be required as a function of stroke lengths that are required for achieving a particular optical effect.

Thus, it is a feature of the method according to the invention that a penetration depth of the expansion cutting die is reduced in increments so that an optical appearance of a continuously variable loop length and/or loop width is achieved.

Alternatively, it is provided that the feed velocity of the metal sheet remains unchanged during the adjustment of the penetration depth of the movable cutting die.

In another advantageous embodiment of the method according to the invention it is provided that a dimensional change of the bar width caused by the penetration depth of the expansion cutting die, wherein the bars are arranged between the openings of the loops is compensated by a chance of the feed velocity.

In an advantageous embodiment the feed velocity of the metal sheet can be proportional, over proportional or under proportional to a time that is required to adapt the penetration depth of the movable cutting die.

BRIEF DESCRIPTION OF THE DRAWINGS

Further advantages and a better comprehension of the invention can be derived from the subsequent description of advantageous embodiments with reference to drawing figures, wherein.

DETAILED DESCRIPTION OF THE INVENTION

An expanded metal or an expanded metal structure according to the invention is designated overall with the reference numeral 10.

The expanded metal structure 10 is formed by a plurality of loops 11. Each loop includes a loop opening 12 that is enveloped by loop bars 13 that are subsequently designated as bars 13. The bars 13 that envelop the bop openings 12 are connected among one another by so called nodes 14.

The expanded metal structure 10 is produced by running a metal sheet through an expansion device in a feed direction V. Thus, the sheet metal is pushed along between two cutting dies. One of the cutting dies is stationary, another one of the cutting dies is movable. The movable cutting die moves up and down vertically, wherein expansion teeth penetrate the metal plate with each downward movement and sheet metal material is displaced without chipping. This generates typically diamond shaped openings in the sheet metal.

The loop openings 12 or the loops 11 are therefore arranged in rows R adjacent to each other and in columns B behind one another. Thus, it is appreciated that the moveable expansion cutting die is moved in an alternating horizontal motion back and forth between two penetration positions. Therefore, the loops 11 or loop openings 12 of two rows R that are behind one another in the feed direction are arranged offset relative to each other.

Therefore, the nodes 14 described supra are arranged between two loop openings 12 that are arranged in columns B behind one another and in two rows R arranged adjacent to each other.

An expanded metal structure 10 can be defined by different variables. One option is e.g. to define the loop dimensions. A loop 11 includes a loop opening 12 and bars that envelop the loop opening 12. A loop length ML is measured from a node center to a node center of two nodes that are arranged opposite to one another in a feed direction V and that envelop the loop opening 12. A loop width MB is therefore measured from node center to node center of two nodes 14 that are arranged transversal to the feed direction, thus horizontally opposed and that envelop the loop opening 12.

The loop dimensions thus defined, however, do not necessarily define a ratio of opening surface to bar surface. With loop dimensions predefined, dimensions of the loop openings 12 or the bars 13 thus in particular the bar width can vary. Thus, however, the bar width is a function of a size of the loop openings 12. However, the greater the loop opening 12, the narrower the enveloping bars 13.

In order to determine the loop opening dimensions a loop opening length OL and a loop opening width OB can be used among other variables. The loop opening length OL is measured along a path that extends from a node center to a node center of two nodes 14 that envelop the loop opening 12 in the feed direction V. The loop opening width OB is measured along a path that extends from a node center to a node center of two nodes 14 that are arranged opposite to one another transversal to the feed direction and envelop the loop opening 12.

The loop opening width OB and the loop opening length OL and thus the respective bar width can be varied by the penetration depth of the expansion cutting die in the sheet metal since teeth of the expansion cutting die are typically formed cone shaped. This is necessitated by fabrication requirements since the cone shape of the expansion cutting die teeth does not only reduce a force required to penetrate the expansion cutting die in the sheet metal but also facilitates a simple disengagement of the sheet metal from the expansion cutting die when the expansion cutting die performs a lever movement.

The bar width can be varied by the feed velocity of the sheet metal through the expansion device while keeping the loop opening 12 constant. An increasing feed velocity causes an increasing bar width. A decreasing feed velocity causes a reduced bar width.

The inventors have found that influencing these parameters in a running expanded metal fabrication process, this means for a continuously operating expansion device can produce novel expanded metal structures 10 which facilitates using the expanded metal in particular for automotive interior trim pieces like speaker covers or covers for dash boards.

Based on FIGS. 1-4, different expanded metals 10 or expanded metal structures 10 are described. Furthermore, the fabrication method and variants thereof are described.

Figure 1:
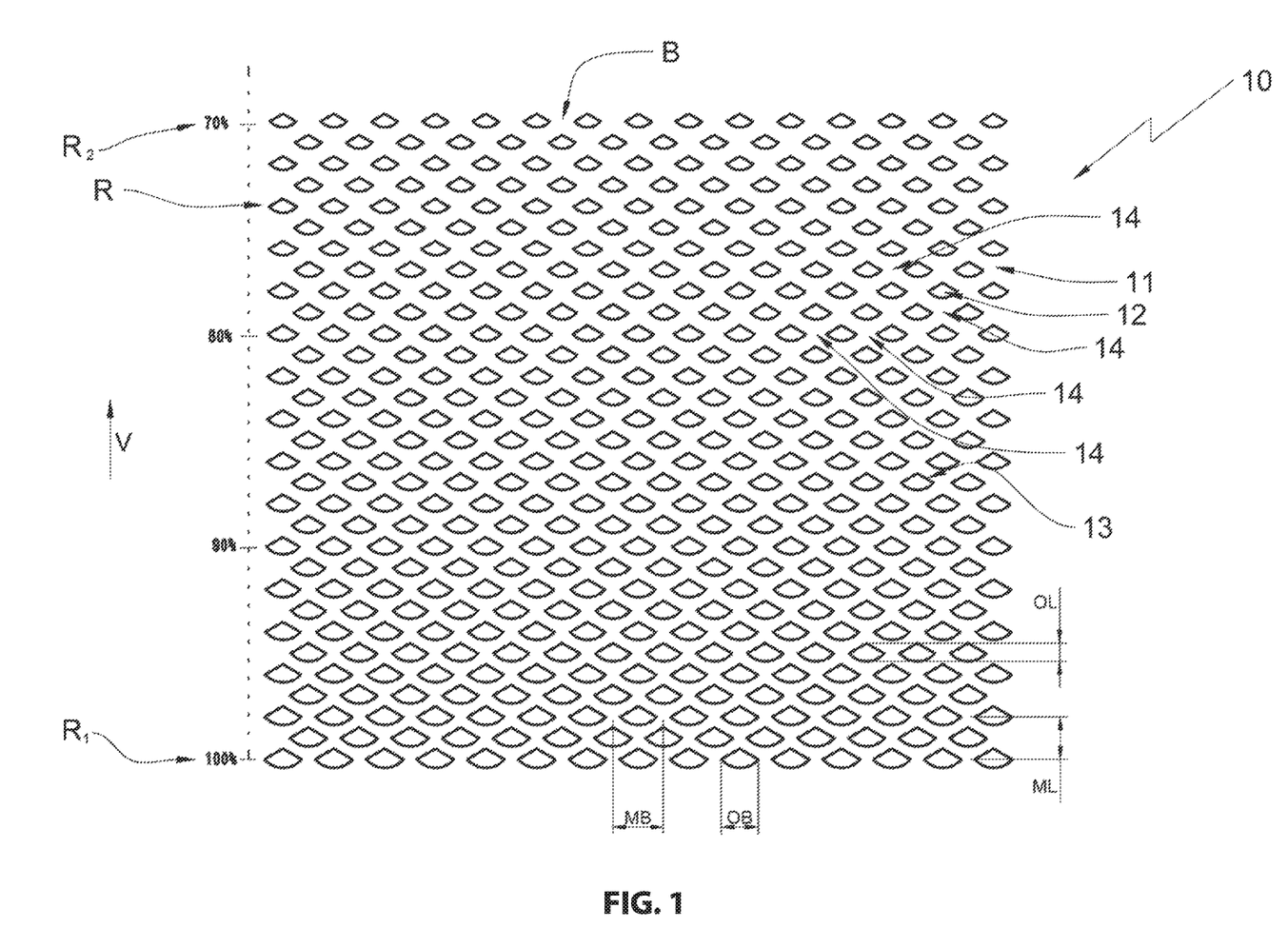
FIG. 1 illustrates an expanded metal according to the invention in a first embodiment.

FIG. 1 shows an expanded metal structure 10 with loops 11 arranged behind one another in columns B and adjacent to one another in rows R.

A loop row $R_1$ arranged last in the feed direction V has an identical loop dimension defined by the loop length ML and the loop width MB as a loop row $R_2$ arranged first and foremost in the feed direction V. However, it is evident that the loop opening dimensions of the loop rows $R_1$ and $R_2$ differ. The opening width OB and the opening length OL of the openings 12 in the loop row $R_1$ are significantly larger than the opening length OL and the opening width OB of the loop row $R_2$. Since the opening dimensions OL and OB vary with constant loop dimensions ML, MB a bar width of bars 13 arranged between the loop openings 12 increases from the loop row $R_1$ to the loop row $R_2$. The bars 13 of the loop row $R_2$ are significantly wider than the bars 13 of the loop row $R_1$.

Due to the loop openings 12 becoming continuously smaller between the loop row $R_1$ and the loop row $R_2$ an expanded metal structure 10 is created that provides an optically uniform, quasi continuous reduction of the opening dimensions OB, OL which generates a harmonious optical appearance of the structure.

The expanded metal structure 10 is producible by a fabrication method that reduces the penetration depth of the expansion cutting die into the metal sheet from loop row R to loop row R while maintaining a constant feed velocity of the metal sheet through the expansion device, in the illustrated embodiment a surface area of the loop openings 12 is reduced from loop row R to loop row R by 10% respectively. Therefore a die stroke of the expansion cutting die has to be reduced from a penetration stroke to another penetration stroke.

Figure 2:
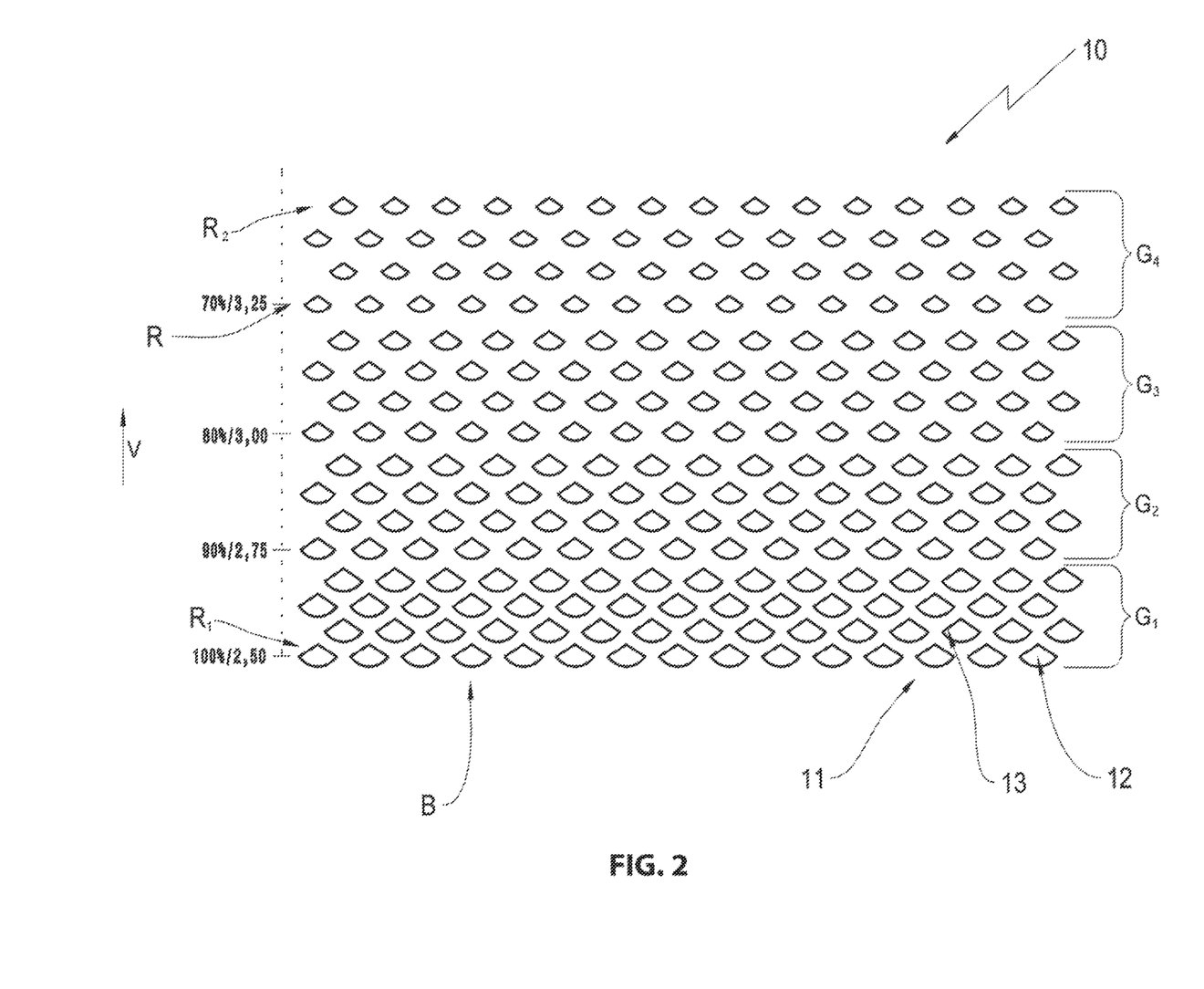
FIG. 2 illustrates the expanded metal in a second embodiment

FIG. 2 illustrates an expanded metal structure 10 where plural loops 11 or loop openings 12 that are arranged in rows R adjacent to one another and in columns B behind each other are combined in groups $G_1$, $G_2$, $G_3$, and $G_4$ that include loop openings with equal sizes.

It is evident that the loop openings 12 of the group $G_1$ have the largest dimensions and the loop openings 12 of the group $G_4$ have the smallest dimensions. The dimensions of the loop openings 12 decrease in the feed direction V from the group $G_1$ from the group $G_4$. In fact, the size of the loop openings decreases from group to group by 10% respectively.

This is in turn achieved by a penetration depth of the expansion cutting die of the expansion device that is adjusted lower from group to group.

Figure 4:
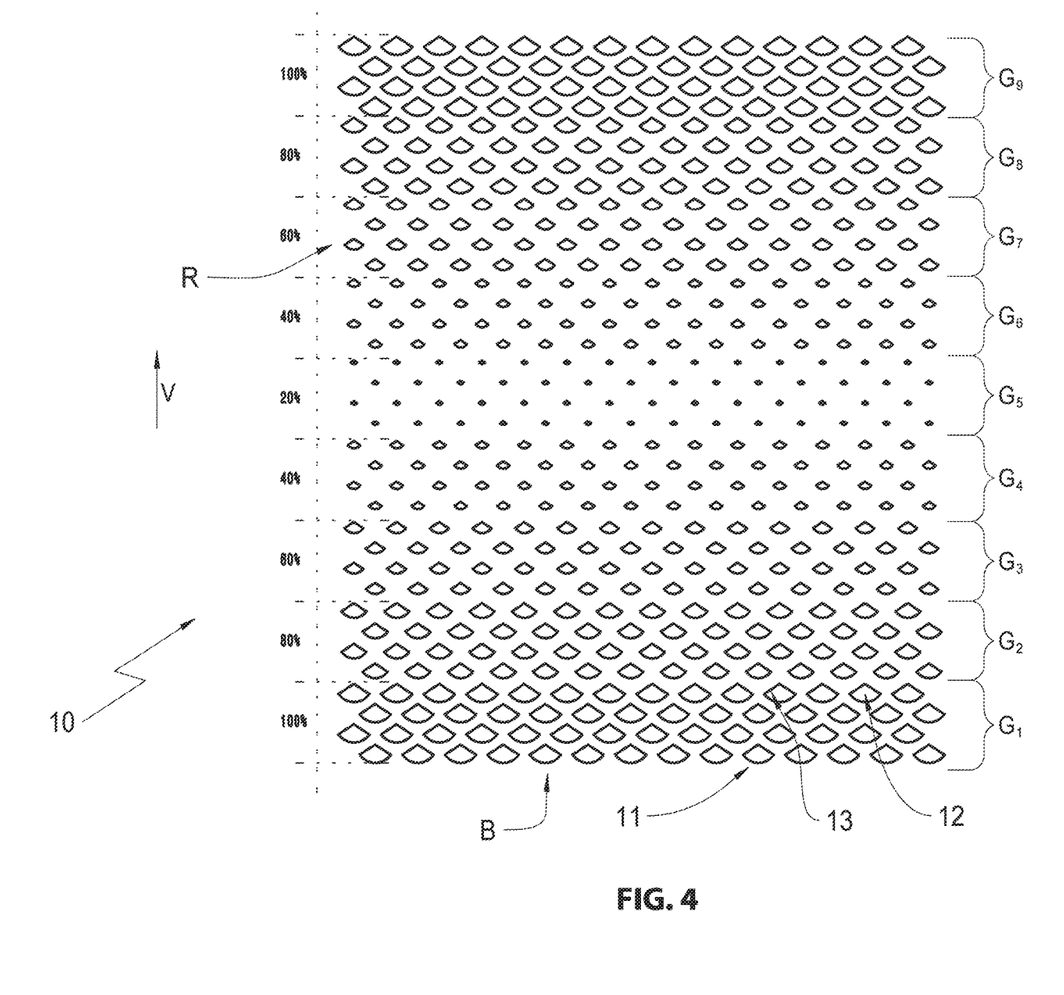
FIG. 4 illustrates an expanded metal according to the invention in a fourth embodiment.

Comparing the bars 13 that are arranged between the loop openings 12 of the row $R_2$ in FIG. 1 with the bars 13 that are arranged between the loop openings 12 of the group $G_4$ larger bar width is evident while the loop opening size remains constant. Therefore the loop size increases accordingly between the groups $G_1$ and $G_4$. This is achieved by increasing the feed velocity. In the embodiment of FIG. 4 the feed velocity increases from group to group by 10% over the initial feed velocity.

Increasing the feed velocity a portion of closed expanded metal surfaces increases more quickly in comparison to producing the expanded sheet metal 10 with constant feed velocity. Thus, a transition from portions that are open for technical reasons to closed portions that are aesthetically desirable can be produced over a shorter distance.

Figure 3:
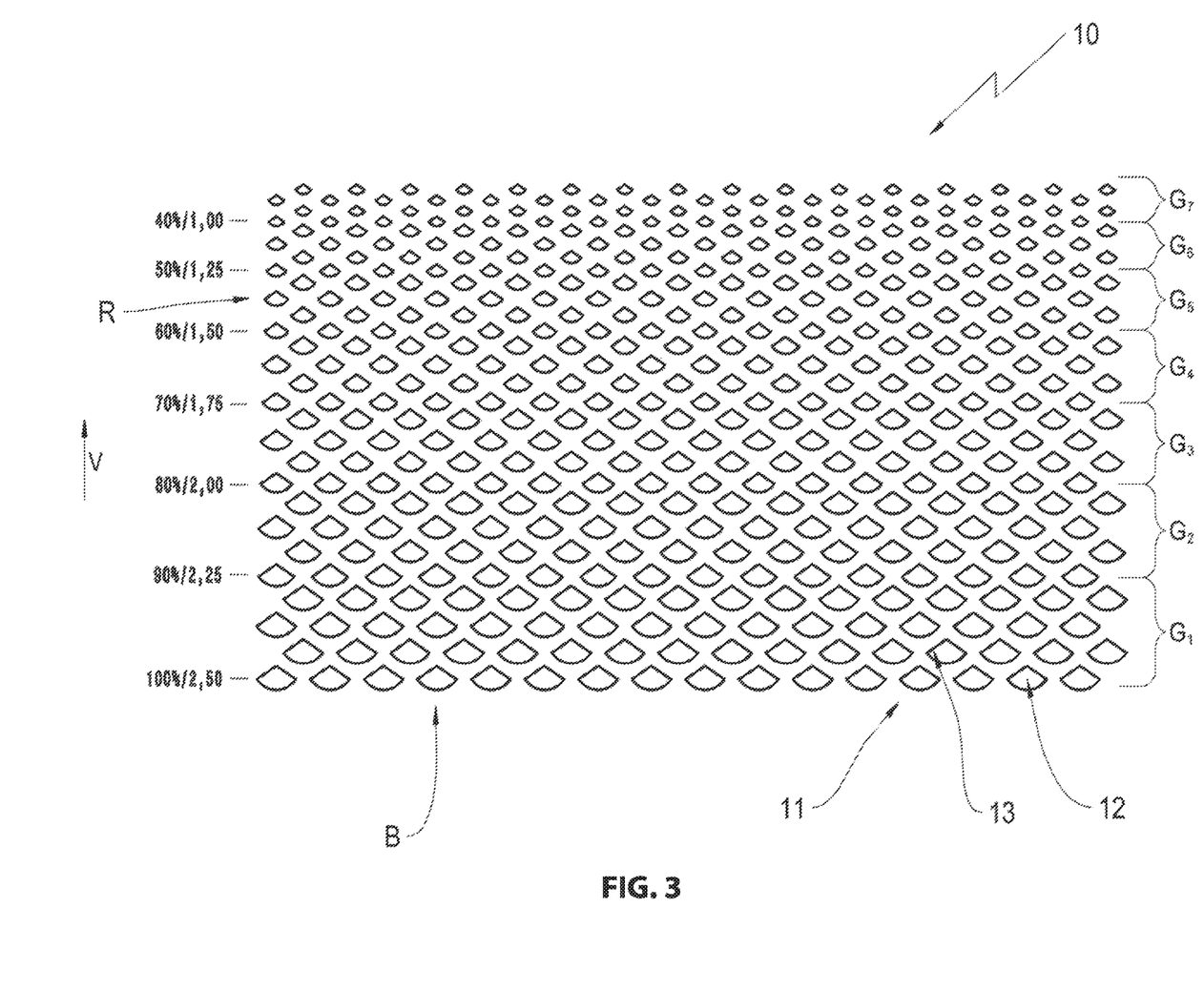
FIG. 3 illustrates the expanded metal in a third embodiment.

FIG. 3 illustrates an expanded metal structure 10 where loops 11 with constant size with loop openings 12 with constant size that are arranged in rows R adjacent to one another and in columns B behind one another are combined in groups $G_1$ through $G_6$. Also here the loop opening size is reduced from group to group by approximately 10%. Simultaneously the feed velocity is reduced with each reduction of the loop opening size, in the particular case respectively by 10% of the initial feed velocity when producing the loops 11 of the group $G_1$. Therefore a bar width of the bars 13 arranged between the loop openings 12 remains essentially constant which reduces the loop size. Overall this produces a compressed optical appearance with an impression of a continuous size increase of the loop opening provided that the loop groups $G_1$ through $G_6$ have an identical number of loop rows, it is appreciated that the optical effect can be adjusted in that a number of loop rows R within a group $G_1$ through $G_6$ is increased.

Last not least FIG. 4 illustrates another advantageous expanded mental structure 10. Also here groups of rows R with equally sized loops 11 and equally sized loop openings 12 are formed that are designated herein with $G_1$ through $G_9$. The loop opening size is reduced by 20% from group to group until the loop openings of the group $G_5$ only have a fifth of the surface area of the loops of the group $G_1$. After reducing the loop opening sizes in the feed direction V from the loop group $G_1$ through $G_5$ the loop opening size is increased again to 100% through the groups $G_5$ through $G_9$. Thus, the loop dimensions are not changed since the feed velocity remains constant.

Overall the invention produces expanded metal structures 10 which have varied loop opening sizes OB, OL and varied loop sizes MB, ML caused by a variation of a penetration depth of the expansion cutting die end the feed velocity which facilitates implementing various optical effects. It is possible in particular to vary the open areas relative to the closed areas of the expanded metal 10 by varying the loop opening sizes MB, ML. On the other hand side, it is possible to keep the ratio of open and closed areas in the expanded metal 10 essentially constant by adjusting the feed velocity accordingly while reducing or increasing the penetration depth.

REFERENCE NUMERALS AND DESIGNATIONS 10 expanded metal, expanded metal structure
11 loop
12 loop opening
13 bar
14 node, node center
G group of loop rows
B loop column
R loop row
V feed direction
MB loop width
ML loop length
OL loop opening length
OB loop opening width

What is claimed is:

1. An expanded metal produced by repeated penetration of a movable cutting die including teeth into a metal sheet that is run through an expansion device in a feed direction, the expanded metal comprising:
a plurality of loops, each having an identical number of vertices,
wherein the loops include bars that envelop loop openings and that are connected in nodes,
wherein each of the loops includes a loop opening length measured in the feed direction along a line from a node center to another node center of two nodes that are arranged adjacent to one another in columns that extend parallel to the feed direction,
wherein each of the loops includes a loop opening width measured transversal to the feed direction along a line from a node center to a node center of two nodes that are arranged adjacent to each other transversal to the feed direction,
wherein the loops are arranged adjacent to one another in rows that extend transversal to the feed direction,
wherein the loop opening length of loops arranged adjacent to one another in the columns varies in the feed direction along a longitudinal section of the expanded metal, wherein the loop opening length of loops arranged adjacent to each other in the rows is constant,
wherein the loop opening width of the loops arranged adjacent to one another in the columns in the feed direction varies in the feed direction along a longitudinal section of the expanded metal wherein the loop opening width of the loops that are arranged adjacent to each other in the rows is constant,
wherein the loop opening width or the loop opening length of the loops that are arranged in the columns adjacent one another in the feed direction varies from row to row, and
wherein differences in the loop opening width and the loop opening length from row to row are sized so that the loop opening width and the loop opening length change continuously from row to row, and wherein the number of vertices is three.

2. The expanded metal according to claim 1, wherein a bar width of the loops that are arranged in rows adjacent to one another and in the columns adjacent to one another in the feed direction is constant in spite of a variation of the loop opening length and the loop opening width.

3. The expanded metal according to claim 1, wherein a bar width of the loops that are arranged adjacent to one another in the rows and adjacent to one another in the columns in feed direction varies as a function of a variation of the loop opening length and the loop opening width.

4. An expanded metal produced by repeated penetration of a movable cutting die including teeth into a metal sheet that is run through an expansion device in a feed direction, the expanded metal comprising:
a plurality of loops, each having an identical number of vertices,
wherein the loops include bars that envelop loop openings and that are connected in nodes,
wherein each of the loops includes a loop opening length measured in the feed direction along a line from a node center to another node center of two nodes that are arranged adjacent to one another in the feed direction,
wherein each of the loops includes a loop opening width that is measured transversal to the feed direction along a line from a node center to a node center of two nodes that are arranged adjacent to each other transversal to the feed direction,
wherein the loops are arranged adjacent to one another in rows that extend transversal to the feed direction and behind one another in columns that extend parallel to the feed direction,
wherein the loop opening length of loops arranged behind one another in the columns varies in the feed direction along a longitudinal section of the expanded metal, wherein the loop opening length of loops arranged adjacent to each other in the rows is constant, wherein the loop opening width of the loops arranged behind one another in the columns in the feed direction varies in the feed direction along a longitudinal section of the expanded metal wherein the loop opening width of the loops that are arranged adjacent to each other in the rows is constant, wherein the loops of rows that are arranged sequentially in the feed direction form groups, and wherein the loop opening width or the loop opening length of the loops of a group are identical, however different groups have different loop opening widths or different loop opening lengths, wherein the number of vertices is three.

5. The expanded metal according to claim 4, wherein the loop opening width of loops of a group is constant but differs from group to group.

6. The expanded metal according to claim 4, wherein the loop opening width of loops of different groups is constant.

7. The expanded metal according to claim 4, wherein the loop width of the loops that are arranged in the rows adjacent to one another is constant but differs from loop row to loop row within a group.

\* \* \* \* \*